(12) United States Patent
Weder

(10) Patent No.: US 7,836,665 B2
(45) Date of Patent: Nov. 23, 2010

(54) METHOD OF TRANSPORTING PREFORMED FLOWER POT COVERS

(75) Inventor: Donald E. Weder, Highland, IL (US)

(73) Assignee: Wanda M. Weder & Bill F. Straeter, Highland, IL (US), Not individually but solely as Trustees of The Family Trust U/T/A dated 12/8/1995

( * ) Notice: Subject to any disclaimer, the term of this patent is extended or adjusted under 35 U.S.C. 154(b) by 215 days.

(21) Appl. No.: 12/215,146

(22) Filed: Jun. 25, 2008

(65) Prior Publication Data

US 2009/0320410 A1    Dec. 31, 2009

(51) Int. Cl.
B65B 13/02 (2006.01)
B65B 35/50 (2006.01)

(52) U.S. Cl. .......................................... 53/399; 53/447

(58) Field of Classification Search ................... 53/397, 53/399, 445, 447, 472, 540, 580, 581, 156, 53/142, 139.5; 414/788.2; 206/386, 499, 206/585, 595, 596, 597
See application file for complete search history.

(56) References Cited

U.S. PATENT DOCUMENTS

| | | | |
|---|---|---|---|
| 1,280,692 A | 10/1918 | Errett | |
| 1,398,030 A | 11/1921 | Luellen | |
| 3,754,645 A * | 8/1973 | Kilroy | 206/596 |
| 3,759,303 A | 9/1973 | Honrichs et al. | |
| 3,804,234 A | 4/1974 | Gordon | |
| 4,033,455 A | 7/1977 | Robison | |
| 4,170,294 A | 10/1979 | Zelinkski | |
| 4,227,362 A | 10/1980 | Wallsten | |
| 5,092,464 A | 3/1992 | Taylor et al. | |
| 5,195,296 A | 3/1993 | Matsumoto | |
| 5,203,531 A | 4/1993 | Gracon | |
| 5,472,752 A | 12/1995 | Weder et al. | |
| 5,551,563 A | 9/1996 | Allen | |
| 5,634,555 A | 6/1997 | Dunham | |
| 5,758,771 A * | 6/1998 | Rose | 206/386 |
| 5,797,246 A | 8/1998 | Martin-Cocher et al. | |
| 6,032,801 A | 3/2000 | Jupille et al. | |
| 6,122,896 A | 9/2000 | Weder et al. | |
| 6,152,305 A | 11/2000 | Green | |
| 6,311,628 B1 * | 11/2001 | Smith et al. | 108/55.1 |
| 6,725,627 B2 | 4/2004 | Weder et al. | |

* cited by examiner

Primary Examiner—Louis K Huynh
(74) Attorney, Agent, or Firm—Dunlap Codding, P.C.

(57) ABSTRACT

The present invention is directed to a method of transporting and packaging a plurality of preformed flower pot covers. Each preformed flower pot cover is formed from a flexible sheet of material which is of a shape and size to receive a flower pot. Each preformed flower pot cover has a base with a closed lower end and an open upper end with an object opening extending therethrough for receiving the flower pot and further having a decorative skirt extending angularly upwardly and outwardly from the upper end of the base. The method of the present invention includes the step of providing a portable platform configured to stabilize, receive, support and protect a plurality of stacked preformed flower pot covers. The platform with the preformed flower pot covers can then be wrapped to further stabilize the stacks of preformed flower pot covers so that the platform can be transported to a predetermined destination.

7 Claims, 5 Drawing Sheets

METHOD OF TRANSPORTING PREFORMED FLOWER POT COVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The presently disclosed and claimed invention relates generally to the transporting of articles on pallets, and more particularly, but not by way of limitation, to an improved method of packaging and transporting preformed flower pot covers.

2. Brief Description of the Related Art

Decorative covers for flower pots have been used for many years to accentuate or complement the aesthetic appearance of a floral grouping disposed in the flower pot. Such decorative covers are often preformed flower pot covers made by forming a flexible sheet of material into a shape adapted to receive a flower pot.

In the process of forming the sheet of material into the flower pot cover, a plurality of overlapping folds are formed in the sheet of material. The overlapping folds cooperate to provide structural strength to keep the preformed shape of the flower pot cover. In addition, flower pot covers are often formed to have a skirt portion which is designed to extend beyond the upper end of the flower pot and functions to cover the soil and the lower portion or stem portion of a floral grouping which can be unattractive and thus draw away from the attractiveness of the combination of the blooms of the floral grouping and the flower pot cover.

To transport flower pot covers after the forming process, a plurality of preformed flower pot covers are typically stacked or nested relative to one another and the stack is placed in a cardboard box. After several stacks of the preformed flower pot covers have been placed in the box, the box is closed and sealed.

While the use of cardboard boxes have been widely accepted in the packaging and transporting of preformed flower pot covers, they are not without disadvantages. For example, cardboard boxes represent a disposal problem for the receiver of the flower pot covers. In addition, the contents of the box can not be inspected without unsealing and opening the box. As such, one is unable to observe the quality and quantity of the flower pot covers prior to opening the box.

To this end, a method of packaging preformed flower pot covers is needed that permits easy transport of a large quantity of flower pot covers while overcoming the disadvantages mentioned above. It is to such a method that the presently disclosed and claimed invention is directed.

DETAILED DESCRIPTION OF THE INVENTION

Figure 1:
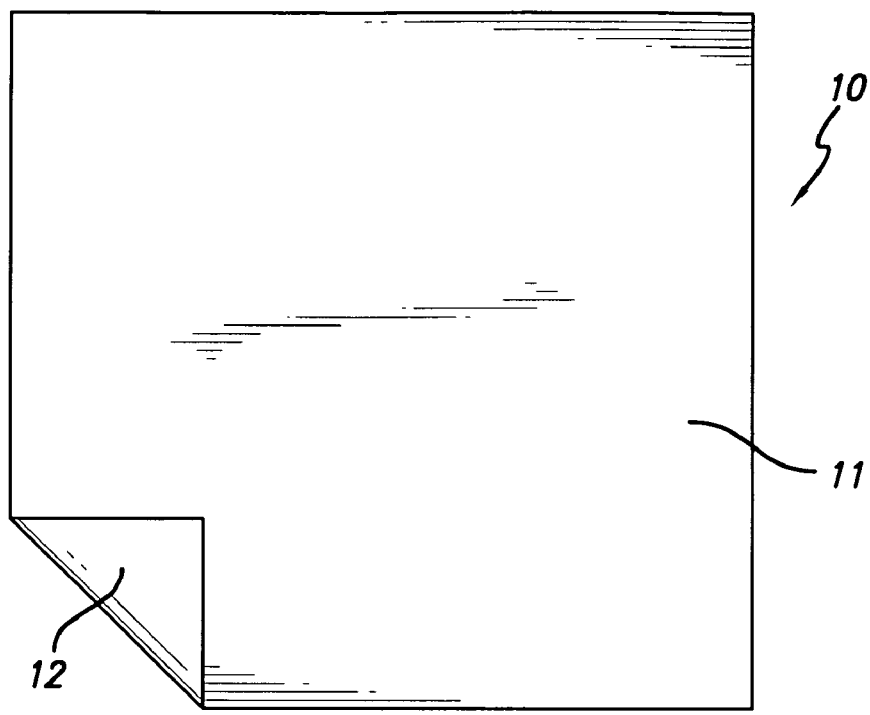
FIG. 1 is a perspective view of a flexible sheet of material used to form a flower pot cover.

Before explaining at least one embodiment of the invention in detail, it is to be understood that the invention is not limited in its application to the details of construction and the arrangement of the components or steps or methodologies set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The presently disclosed and claimed invention is directed to a method of transporting and packaging a plurality of preformed flower pot covers (also referred to as flower pot covers). Each preformed flower pot cover is formed from a flexible sheet of material which is formed into a shape and size to receive a flower pot. The preformed flower pot cover has a base with a closed lower end and an open upper end with an object opening extending therethrough for receiving the flower pot.

In one embodiment, the method of the presently disclosed and claimed invention includes providing a portable platform having at least one preformed flower pot cover receiving recess. Each preformed flower pot cover receiving recess is surrounded by an upper angular surface so that when a stack of preformed flower pot covers is placed in the preformed flower pot cover receiving recess, a portion of each skirt of the preformed flower pot cover is positioned on and supported by the upper angular surface disposed about the at least one preformed flower pot cover receiving recess provided in the portable platform. Each preformed flower pot cover receiving recess is configured to stabilize, receive and protect a plurality of stacked preformed flower pot covers during transportation. The at least one stack of preformed flower pot covers can then be secured to the platform using stretch wrap, shrink wrap, straps, tape, rope or the like and then transported to a predetermined destination.

Another embodiment of the presently disclosed and claimed invention includes the step of providing a portable platform having a substantially planar upper surface and at least one preformed flower pot cover receiving recesses having a diameter greater than the diameter of the base of the preformed flower pot covers. Each preformed flower pot cover receiving recess is configured to stabilize, receive and protect the at least one stack of preformed flower pot covers during transportation. The at least one stack of preformed flower pot covers are supported within the at least one preformed flower pot cover receiving recess so that at least a portion of the portable platform surrounds the at least one preformed flower pot cover receiving recess to provide support for a portion of the skirt of each preformed flower pot cover in the at least one stack of preformed flower pot covers supported by the at least one preformed flower pot cover receiving recess. The at least one stack of preformed flower pot covers can then be secured to the platform using stretch wrap, shrink wrap, straps, tape, rope or the like and then transported to a predetermined destination.

Yet another embodiment of the presently disclosed and claimed invention is a method which includes providing a portable platform having a plurality of stabilizing members or shells extending therefrom. Each stabilizing member or shell is configured to stabilize, receive and protect at least one stack of preformed flower pot covers. A stack of preformed flower pot covers is stacked on the portable platform so that the preformed flower pot covers of the stack are nested within one another and supported and stabilized in between the stabilizing members or shells. The at least one stack of preformed flower pot covers can then be secured to the platform using stretch wrap, shrink wrap, straps, tape, rope or the like and then transported to a predetermined destination.

The objects, features and advantages of the presently disclosed and claimed invention will become apparent from the following detailed description when read in conjunction with the accompanying drawings and appended claims.

Referring now to the drawings, and more particularly to FIG. 1, shown therein is a substantially square shaped flexible sheet of material 10 used for forming flower pot covers 13. The sheet of material 10 is typically fabricated from a polymeric material, for example but not by way of limitation, polypropylene, polyvinyl chloride and combinations thereof. However, it will be appreciated that the sheet of material 10 can be fabricated of paper, metallic film, foil, cloth, denim, burlap or the like. Further, at least a portion of the sheet of material 10 may be extruded and/or modified in any manner to provide a decorative appearance and/or texture thereto. Such modifications include but are not limited to, printing, embossing, texturing coloring, engraving, an appearance and/or texture simulating the appearance and/or texture of cloth, an appearance and/or texture simulating the appearance and/or texture of paper, as well as combinations thereof.

The thickness of the sheet of material 10 can vary widely, however desirable results can be obtained where the sheet of material 10 is relatively thin having a thickness in a range from about 0.5 mil to about 30 mil, and is very flexible and flimsy so that the sheet of material 10 will not normally maintain or hold a predetermined formed shape (non-shape sustaining). The sheet of material 10 is provided with an upper surface 11 and a lower surface 12, and at least a portion of either the upper surface 11 or the lower surface 12 or both the upper surface 11 and the lower surface 12 is adapted to be bondable so that when at least a portion of the overlapping folds of the bondable surface are brought into bondable contact, such portions are bondably connected.

Figure 2:
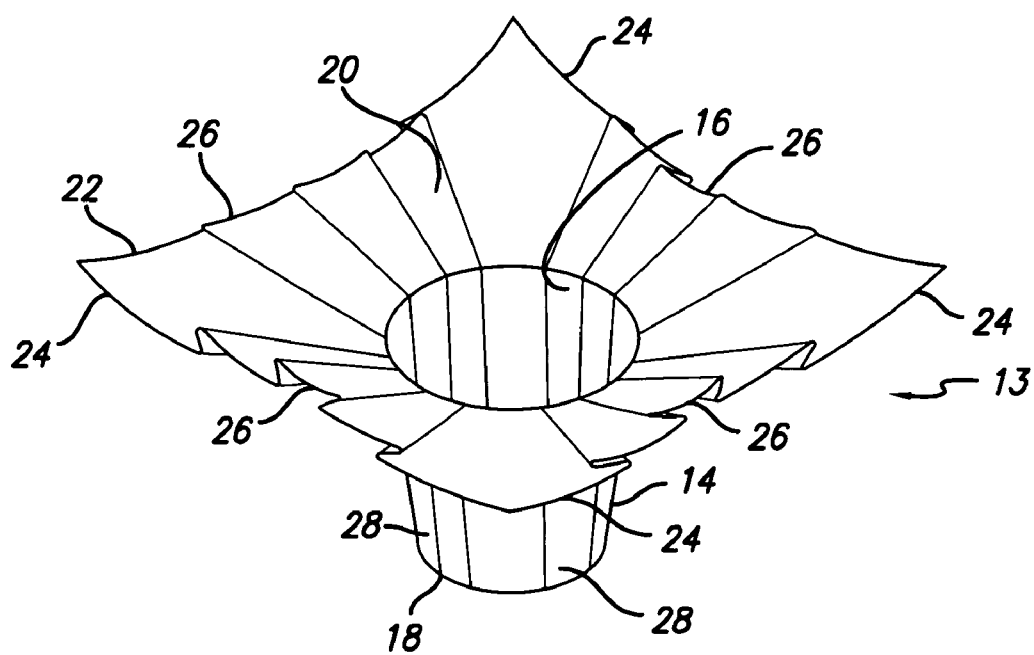
FIG. 2 is a perspective view of the prior art preformed flower pot cover.

Referring now to FIG. 2, shown therein is a preformed flower pot cover 13 formed from the flexible sheet of material 10. The preformed flower pot cover 13 includes a base 14 having an open upper end 16, a closed lower end 18, an object opening 20 extending through the open upper end 16, and a decorative skirt 22 which extends angularly upwardly and outwardly from the upper end 16 of the base 14. The decorative skirt 22 includes four accentuated and sculptured flared petal-like portions 24. Each flared petal-like portion 24 terminates with a pointed end formed by one of the four corners of the sheet of material 10 when the sheet of material 10 is formed into the flower pot cover 13. Further, each flared petal-like portion 24 extends a distance angularly upwardly and outwardly from the open upper end 16 of the base 14 terminating with the pointed end of the flared petal-like portion 24. The flared petal-like portions 24 are spaced apart circumferentially about the decorative skirt 22 and spaced apart at about ninety degree intervals. A flare connecting portion 26 is disposed between each pair of adjacent flared petal-like portions 24. Each of the flare connecting portions 26 extends a distance angularly upwardly and outwardly from the open upper end 16 of the base 14 less than the distances which the pointed ends of the flared petal-like portions 24 extend from the open upper end 16 of the base 14.

The object opening 20 of the preformed flower pot cover 13 is shaped and sized to receive a flower pot (not shown). When a flower pot is disposed in the object opening 20 of the preformed flower pot cover 13, the base 14 substantially encompasses an outer peripheral surface of the flower pot extending generally between the upper and the lower ends of the flower pot with the upper end 16 of the base 14 of the preformed flower pot cover 13 being disposed generally near the upper end of the flower pot and the lower end 18 of the preformed flower pot cover 13 being disposed generally near the lower end of the flower pot. The closed lower end 18 of the preformed flower pot cover 13 extends across and encompasses the lower end of the flower pot. When the preformed flower pot cover 13 is disposed about the flower pot, the decorative skirt 22 of the preformed flower pot cover 13 extends a distance angularly upwardly and outwardly from the upper end of the flower pot and the preformed flower pot cover 13 extends generally circumferentially about the upper end of the flower pot.

The base 14 of the preformed flower pot cover 13 includes a plurality of overlapping folds 28 (only some of the overlapping folds 28 being designated by a reference numeral in the drawings). A substantial portion of the overlapping folds 28 extend at angles to a vertical direction and at angles to a horizontal direction, the various angles being arbitrary and varying from one overlapping fold 28 to another overlapping fold 28. Further, the base 14 of the preformed flower pot cover 13 includes a plurality of overlapping folds 28 with the various overlapping folds 28 being positioned at various positions about the entire outer peripheral surface of the base 14 and at various positions between the upper and the lower ends 16 and 18 of the base 14. The overlapping folds 28 provide an overall decorative appearance to the base 14. However, more significantly, the overlapping folds 28 provides mechanical strength to the base 14 for enabling the base 14 to stand upright (substantially retain the shape of the flower pot cover formed from the sheet of material 10) on the closed lower end 18 of the base 14. In this manner, the base 14 of the preformed flower pot cover 13 has sufficient mechanical strength to stand upright about the flower pot without the necessity of mechanically connecting the base 14 to the flower pot, other than the connection normally provided when the lower end of the flower pot engages the lower end 18 of the preformed flower pot cover 13 when the preformed flower pot cover 13 is disposed about the flower pot.

The overlapping folds 28 are formed by overlapping portions of the bondable surface of the sheet of material 10 and bringing such overlapping portions into bondable engagement or contact. In this manner, the overlapping folds 28 are permanently fixed in the preformed flower pot cover 13. Thus, in those instances when only the lower surface 12 of the flexible sheet of material 10 is prepared to form a bondable surface, the overlapping portions of the bondable lower surface 12 are brought into bondable contact during the forming of the preformed flower pot cover 13 and such overlapping portions are bonded to form the overlapping folds 28. The corresponding overlapping portions of the upper surface 11 of the sheet of material 10 are not bonded. Similarly, in those instances when only the upper surface 11 of the sheet of material 10 is prepared to form a bondable surface, the overlapping portions of the bondable upper surface 11 are brought into bondable contact during the forming of the flower pot cover 13 and such overlapping portions are bonded to form the overlapping folds 28. The corresponding overlapping portions of the lower surface 12 of the sheet of material 10 are not bonded. Finally, in those instances when both the upper surface 11 and the lower surface 12 of the sheet of material 10 are prepared to form bondable upper and lower surfaces, the overlapping portions of the upper surface 11 and the lower surface 12 of the sheet of material 10 are brought into bondable contact during the forming of the preformed flower pot cover 13 and such overlapping portions of the upper surface 11 and the lower surface 12 are bonded to form the overlapping folds 28.

For aesthetic purposes, it is preferable that the decorative skirt 22 and particularly the flared petal-like portions 24 remain substantially smooth and substantially free of bonded overlapping folds. Also, it is desirable that the flare connecting portions 26 also remain substantially smooth and substantially free of bonded overlapping folds.

While one embodiment of preformed flower pot cover has been shown and described herein, it is to be understood that other types of preformed flower pot covers are known in the art and are also contemplated for use with the methods of the presently disclosed and claimed invention. For example but not by way of limitation, preformed flower pot covers having differing configurations of bases and/or skirts are known and also contemplated for use herein, and therefore are fall within the scope of the presently disclosed and claimed invention; thus, the preformed flower pot cover of FIG. 2 is not to be considered as limiting. Other examples of preformed flower pot covers that may be utilized in accordance with the presently disclosed and claimed invention are disclosed in U.S. Pat. No. 5,029,412, issued to Weder et al. on Jul. 9, 1991, and U.S. Pat. No. 5,254,072, issued to Weder et al. on Oct. 19, 1993, both of which are hereby expressly incorporated herein by reference.

Figure 3:
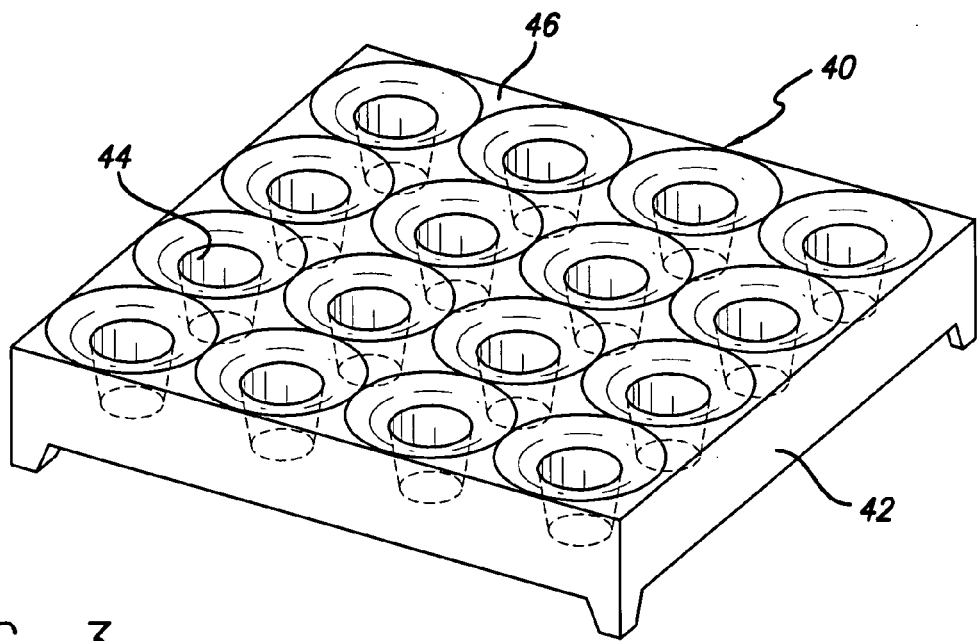
FIG. 3 is a perspective view of a shipping pallet constructed in accordance with the presently disclosed and claimed invention.
Figure 4:
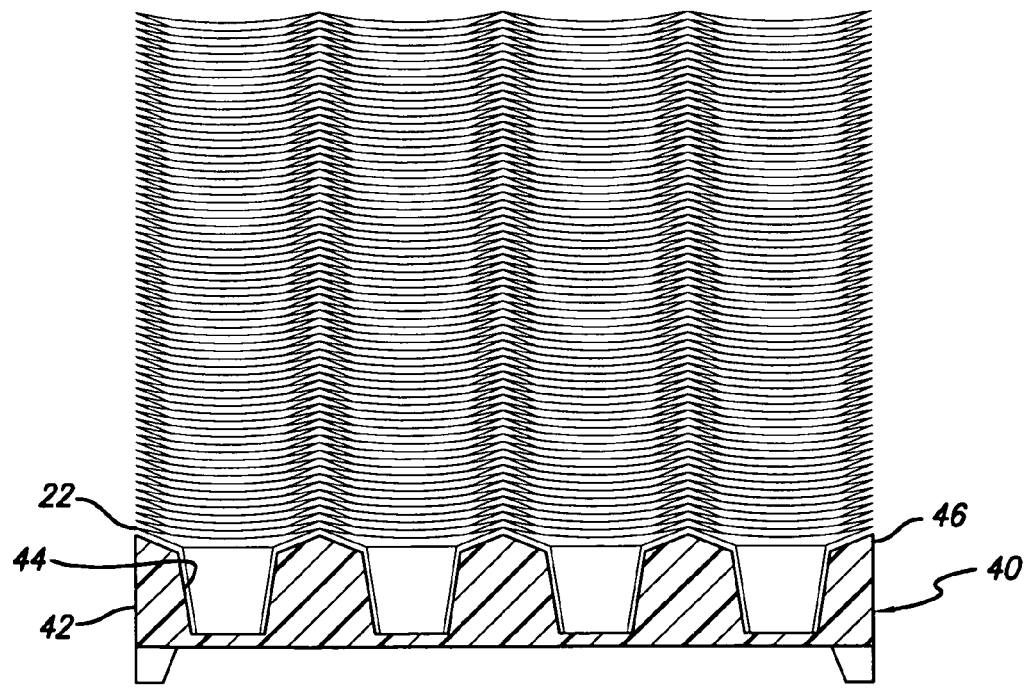
FIG. 4 is an elevational view, partially in cross-section, of the shipping pallet of FIG. 3 having a plurality of stacks of preformed flower pot covers supported thereon.

Referring now to FIGS. 3 and 4 shown therein is a shipping pallet 40 constructed in accordance with the presently disclosed and claimed invention. The shipping pallet 40 includes a portable platform 42 having a plurality of preformed flower pot cover receiving recesses 44 formed therein. The shipping pallet 40 provides a simple and low cost device for packaging and shipping a plurality of preformed flower pot covers 13, in a convenient and cost effective manner. The portable platform 42 is shown to be constructed of a plastic material and formed to provide an upper angled surface 46 surrounding each of the preformed flower pot cover receiving recesses 44. The upper angled surface 46 surrounds each of the preformed flower pot cover receiving recesses 44 to provide support for at least a portion of the decorative skirt 22 of the preformed flower pot covers 13 when the preformed flower pot covers are stacked in the preformed flower pot cover receiving recesses 44 of the portable platform 42.

The thinness of the material used to form the preformed flower pot covers 13 and the nesting ability of the preformed flower pot covers 13 permits a significant number of the preformed flower pot covers 13 to be stacked on one shipping pallet, such as the shipping pallet 40. For example, each stack of preformed flower pot covers 13 may be formed to be as high as six or seven feet, thereby resulting in the positioning of as many as 16,000 six inch diameter preformed flower pot covers on a 48 inch by 48 inch shipping pallet and 42,000 four inch diameter preformed flower pot covers on a 40 inch by 48 inch shipping pallet. In comparison, using the conventional method of shipping preformed flower pot covers in cardboard boxes, a 40 inch by 48 inch pallet will support 30 boxes dimensioned to hold 400 four inch diameter preformed flower pot covers. This constitutes only 12,000 preformed flower pot covers on one pallet versus 42,000 preformed flower pot covers using the method of the presently disclosed and claimed invention.

As previously stated, the preformed flower pot cover receiving recesses 44 are formed within the platform 42. The preformed flower pot cover receiving recesses 44 are each sized and shaped to receive at least a portion of the preformed flower pot covers 13 in an upright position, as described above, and in turn, support a stack of the preformed flower pot covers 13, as shown in FIG. 3. The preformed flower pot cover receiving recesses 44 are further sized so that the decorative skirt 22 of the bottommost preformed flower pot cover 13 extends above the platform 42 so that at least a portion of the decorative skirt engages or is supported by at least a portion of the upwardly angled surface 46 to provide support and prevent damage to the decorative skirts 22. The angled surface 46 of the platform 42 provides added support and prevents damage to the skirt of each preformed flower pot cover 13 from upper forces when the preformed flower pot covers 13 are stacked as described herein. Each stack of preformed flower pot covers 13 supported on the shipping pallet 40 may be secured to the shipping pallet 40 by wrapping a length of stretch wrap around the periphery of the stacks of preformed flower pot covers 13 in the manner described herein and depicted in FIGS. 9-10.

Figure 5:
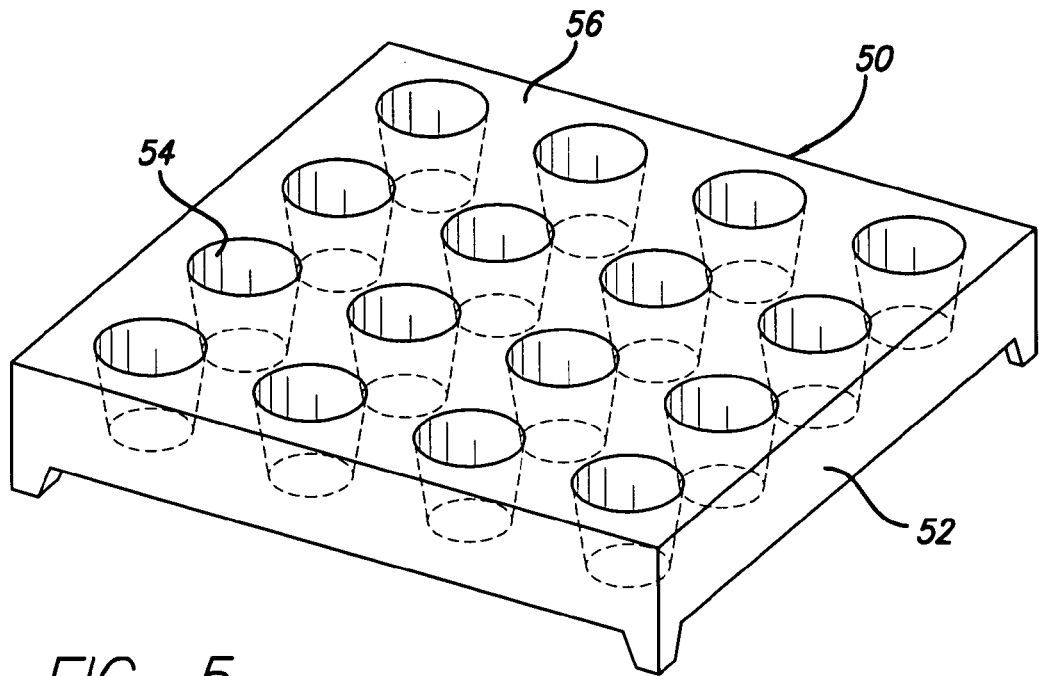
FIG. 5 is a perspective view of another embodiment of a shipping pallet constructed in accordance with the presently disclosed and claimed invention.
Figure 6:
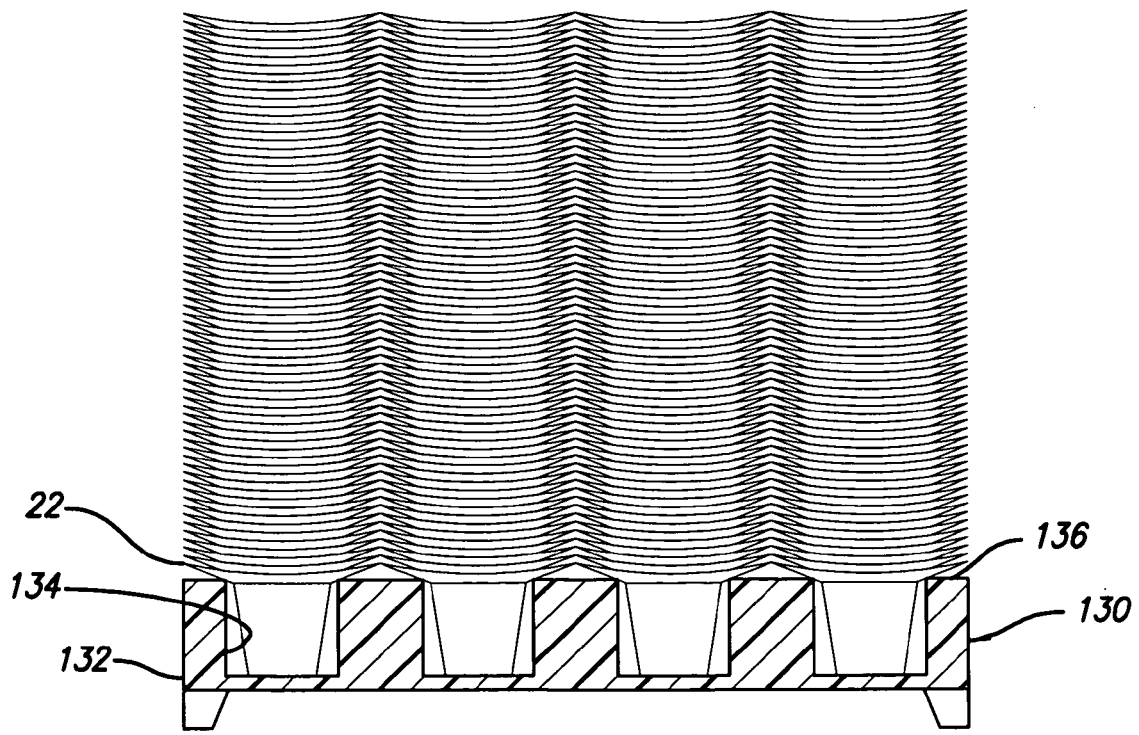
FIG. 6 is an elevational view, partially in cross-section, of FIG. 5 having a plurality of stacks of preformed flower pot covers supported thereon.

Referring now to FIGS. 5 and 6 shown therein is another embodiment of a shipping pallet constructed in accordance with the presently disclosed and claimed invention. The shipping pallet 50 shown in FIGS. 5 and 6 includes a portable platform 52 having a plurality of preformed flower pot cover receiving recesses 54. The platform 52 is shown to be constructed of a plastic material or other suitable material and formed to provide an upper planar surface 56.

The plurality of preformed flower pot cover receiving recesses 54 are formed in the platform 52 and extend from the upper planar surface to a depth substantially corresponding to the length of the base of the preformed flower pot cover 13; however, the depth of the preformed flower pot cover receiving recesses 54 may be slightly deeper than the length of the base of the preformed flower pot cover 13, so that the area surrounding the opening of the preformed flower pot cover receiving recesses 54 is able to come into contact with a portion of the decorative skirt 22 of the preformed flower pot cover 13. The preformed flower pot cover receiving recesses 54 are provided with a diameter substantially greater than the base of the preformed flower pot cover 13, and are each sized and shaped to receive at least one of the preformed flower pot covers 13 described above in an upright position and, in turn, support a stack of the preformed flower pot covers 13, as illustrated in FIG. 6. The preformed flower pot cover receiving recesses 54 are further sized so that at least a portion of the decorative skirt 22 of the bottommost preformed flower pot cover 13 extends above the platform 52, so that the area surrounding the opening of the preformed flower pot cover receiving recess 54 of the platform 52 is partially in contact with the decorative skirt 22 so as to provide added support and to prevent damage to the decorative skirt 22 of each preformed flower pot cover 13 from upper forces when the preformed flower pot covers 13 are stacked. The stack of preformed flower pot covers 13 supported on the shipping pallet 50 may be secured to the shipping pallet 50 by wrapping a length of stretch wrap around the periphery of the stacks of preformed flower pot covers 13 in the manner described herein and depicted in FIGS. 9 and 10.

Figure 7:
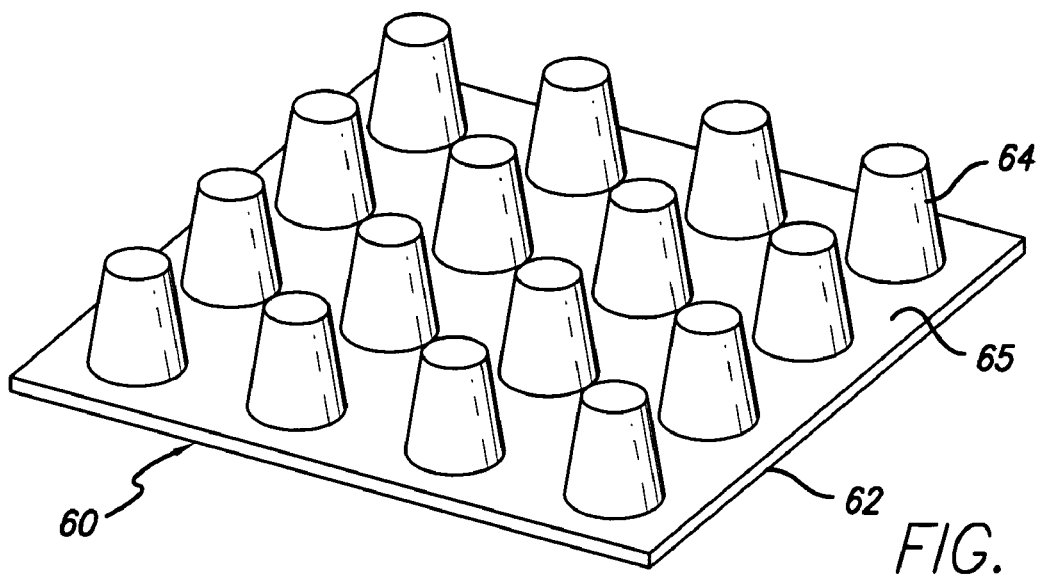
FIG. 7 is a perspective view of another embodiment of a shipping pallet constructed in accordance with the presently disclosed and claimed invention.
Figure 8:
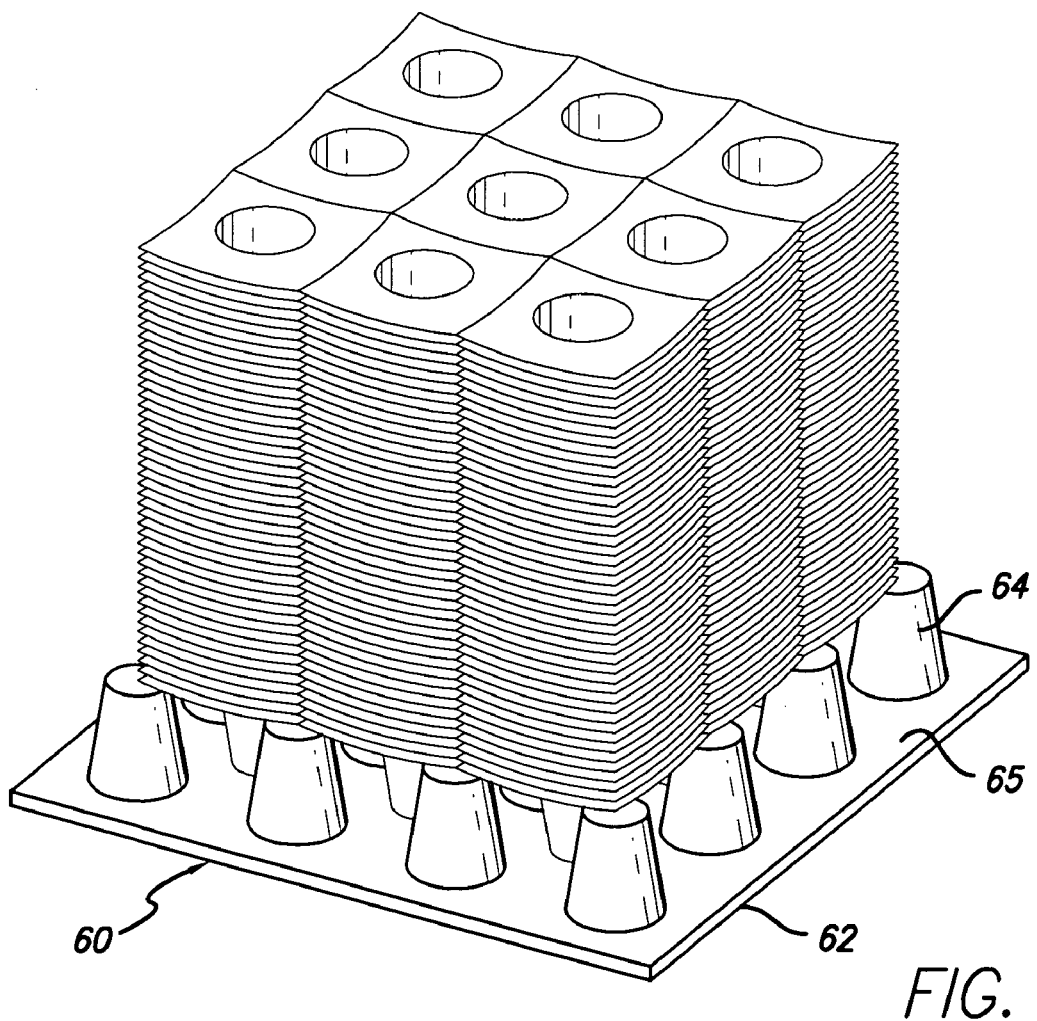
FIG. 8 is an elevational view, partially in cross-section, of the shipping pallet of FIG. 7 having a plurality of stacks of preformed flower pot covers supported thereon.

Referring now to FIGS. 7 and 8, shown therein is another embodiment of a shipping pallet constructed in accordance with the presently disclosed and claimed invention. Shipping pallet 60 shown in FIGS. 7 and 8 includes a portable platform 62 and a plurality of stabilizing members or shells 64 positioned thereon so as to extend upwardly from an upper surface 65 of the portable platform 62. The stabilizing members or shells 64 may be constructed of any suitable material and configured in any desirable shape. However, a preferable material is a lightweight, durable plastic and a preferable shape is substantially frusto-conical because the base of the preformed flower pot covers 13, are typically formed to have a substantially frusto-conical shape for receiving a substantially frusto-conically shaped flower pot. By way of example, each of the stabilizing members or shells 64 could alternatively be a flower pot or a round cardboard tube or styrofoam form having the necessary size and configuration to support a stack of preformed flower pot covers 13. Alternatively, the stabilizing members or shells 64 may assume any shape that will allow them to function in accordance with the presently disclosed and claimed invention, such as but not limited to, square, rectangular, cylindrical, spherical, hexagonal, octagonal, polygonal, and any other desired shape.

The plurality of stabilizing members or shells 64 are positioned to receive, stabilize and protect a plurality of preformed flower pot covers 13. In particular, the stabilizing members or shells 64 are positioned so that a stack of preformed flower pot covers 13 can be placed in an upright position between the stabilizing members or shells 64, whereby the stabilizing members or shells 64 provide stability and support to the stacks of preformed flower pot covers 13. The portable platform 62 of the shipping pallet 60 is in the form of a flat sheet of material commonly known as a slip sheet. Slip sheets are typically manufactured of cardboard, but can be manufactured of any desired material, such as but not limited to, wood, metal, plastic or the like. The stabilizing members or shells 64 may be merely disposed on the platform 62 or secured to the platform 62 with any suitable fastening members, such as but not limited to, nuts and bolts, a suitable adhesive, or the like.

In the method of the presently disclosed and claimed invention, a single stack of preformed flower pot covers 13 may be supported between at least two stabilizing members of shells 64, between at least three stabilizing members of shells 64, between at least four stabilizing members of shells 64, or between at least five stabilizing members or shells 64.

Figure 9:
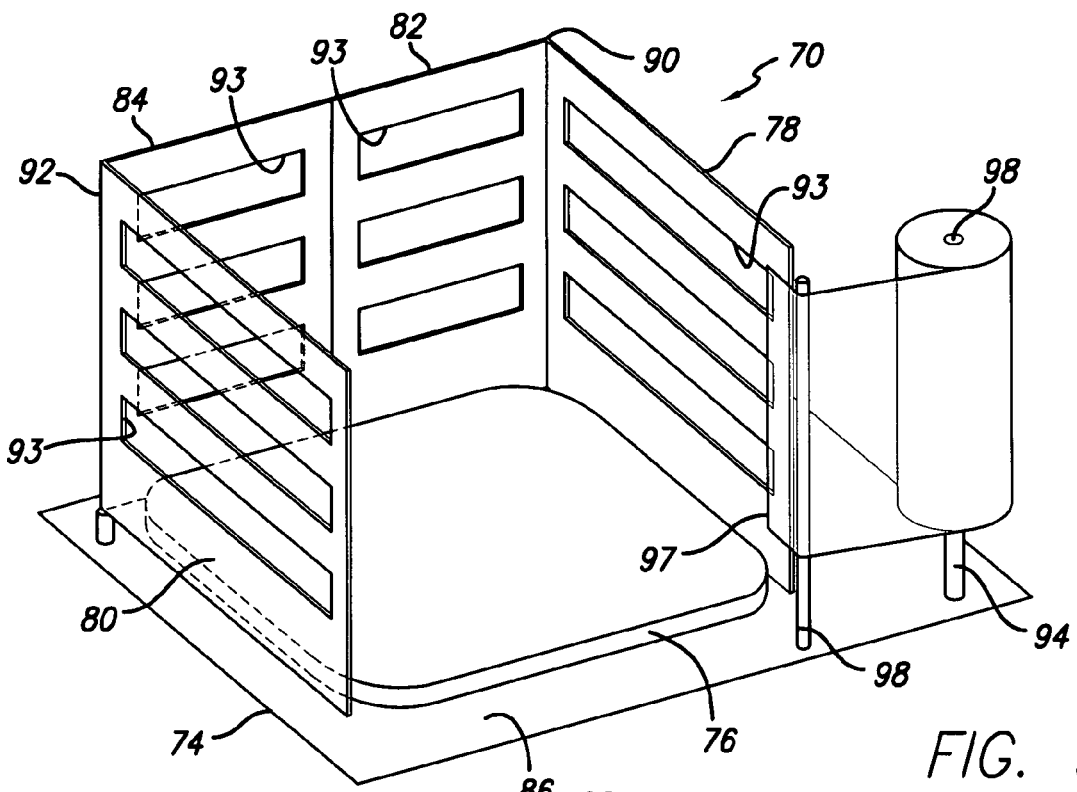
FIG. 9 is a perspective view of a stack wrapping apparatus for stacking and securing a plurality of preformed flower pot covers on any of the shipping pallets of FIGS. 3, 5 and 7.
Figure 10:
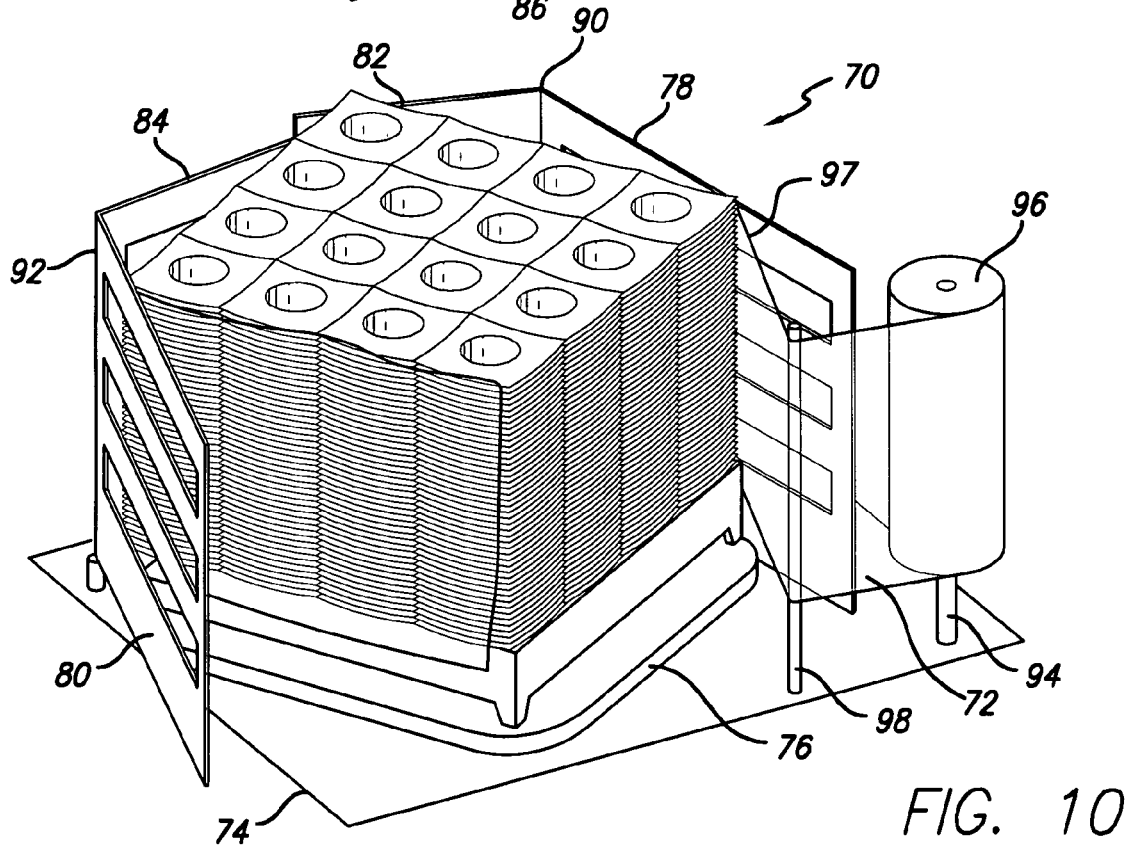
FIG. 10 is a perspective view of the stack wrapping apparatus of FIG. 9 depicting the use thereof for wrapping a sheet of material about a plurality of stacks of preformed flower pot covers to secure the stacks of preformed flower pot covers to the shipping pallet of FIG. 3.

Referring now to FIGS. 9 and 10, shown therein is an apparatus 70 for supporting the preformed flower pot covers 13 on any of shipping pallets 40, 50 and 60 described above. The apparatus 70 can be used to stabilize the preformed flower pot covers 13 during the stacking process and can be used for wrapping sheet of material 72 about the periphery of the stacked preformed flower pot covers 13 for added support during the shipping and storage process.

The sheet of material 72 also serves to protect the preformed flower pot covers 13 from dirt and water damage during the shipping and storage process. The sheet of material 72 is preferably transparent to permit inspection of the preformed flower pot covers 13 without requiring the sheet of material 72 to be first removed. In instances when greater stability may be desired, the sheet of material 72 may be wrapped over the top of the stacks of preformed flower pot covers 13 and underneath the platform. Any suitable material may be utilized as the sheet of material 72, including but not limited to, stretch film, shrink wrap, straps, tape, rope and the like.

While the apparatus 70 can be used to secure the stacks of preformed flower pot covers 13 on any suitable shipping pallet, such as shipping pallets 40, 50 and 60, described above, the apparatus 70 will now be described with reference to shipping pallet 40 for purposes of brevity. The apparatus 70 includes a base member 74, a turntable 76 mounted to the base 74 and adapted to receive the shipping pallet 40 thereon, and a plurality of vertical support panels 78, 80, 82, 84, positioned about the turntable 76. The apparatus 70 is characterized as having an open front end 86, a first side defined by the panel 78, a second side defined by the panel 80, and a back end defined by the panel 82 and the panel 84.

The panel 78 and the panel 82 are supported in a vertical upright position adjacent to the turntable 76 by a spring hinge 90 extending upward from the base 74. The hinge 90 biases the panel 78 and the panel 82 in a perpendicular relationship relative to one another but permits the panel 78 and the panel 82 to swing outwardly away from the turntable 76 upon a force being exerted on the inner surface of the panel 78 and the panel 82.

Likewise, the panel 80 and the panel 84 are supported in a vertical upright position adjacent to the turntable 76 by a spring hinge 92 which biases the panel 80 and the panel 84 in a perpendicular relationship relative to one another but permits the panel 80 and the panel 84 to swing outwardly away from the turntable 76 upon a force being exerted on the inner surface of the panel 80 and the panel 84.

Each support panel 78, 80, 82, 84 is shown to be provided with a plurality of horizontal slots 93 for facilitating the stacking process. However, it should be appreciated that the slots 93 can be formed in the support panels 78, 80, 82, 84 in any number of orientations, such as vertically or diagonally.

The apparatus 70 further includes a rack 94 for supporting a roll of stretch wrap 96 and a guide post 98 for guiding and supporting the sheet of material 72 removed from the roll of material 96.

In use, any of the shipping pallets described herein can be placed on the turntable 76 through the open front end 86 thereof. For purposes of brevity however, the apparatus 70 is being described with reference only to shipping pallet 40. The preformed flower pot covers 13 are stacked onto the stabilizing members or shells of the shipping pallet 40 until the desired number of preformed flower pot covers 13 are positioned on the shipping pallet 40. While the preformed flower pot covers 13 are being stacked onto the pallet 40 and prior to the stack of preformed flower pot covers 13 being secured to the shipping pallet 40 with the sheet of material 72, the panels 78, 80, 82, and 84 serve to support the stacks of preformed flower pot covers 13 in a substantially vertical orientation thereby facilitating the stacking process.

As previously stated, while the wrapping of shipping pallets is described with reference to shipping pallet 40, it should be noted that any of the shipping pallets described herein or any other shipping pallet capable of performing the function described herein may be wrapped as described below. To wrap the stack of preformed flower pot covers 13 with the sheet of material 72, a leading edge 97 of the sheet of material 72 is fed over the guide post 98 and positioned against one of the stacks of preformed flower pot covers 13. The shipping pallet 40 with the stacks of preformed flower pot covers 13 positioned thereon is then rotated in a counterclockwise direction by rotating the turntable 76. Rotation of the shipping pallet 40 and the stacks of preformed flower pot covers 13 in turn causes the sheet of material 72 to be wrapped around the periphery of the stacks of preformed flower pot covers 13 and an upper portion of the platform 40. The sheet of material 72 is caused to be wrapped about the shipping pallet 40 and the stacks of preformed flower pot covers 13 one or more times so as to insure that the sheet of material 72 secures the stacks of preformed flower pot covers 13 to the pallet 40. Upon rotating the shipping pallet 40 and the stacks of preformed flower pot covers 13 the desired number of rotations, a trailing end of the sheet of material 72 is cut or torn from the roll of stretch wrap 96 and secured to an overlapping portion of the sheet of material 72.

The spring hinges 90 and 92 bias the panels 78-84 in a position substantially parallel and adjacent to the sides of the turntable 76. The spring hinges 90 and 92 additionally permit the panels 78-84 to be swung in an outwardly direction relative to the turntable 76 to permit the turntable 76 to rotate. More specifically, to permit the panels 78-84 to support the stacks of preformed flower pot covers 13 positioned on the shipping pallet 40, which has a substantially square shape, and to accommodate the rotation of the square shaped shipping pallet 40 during the wrapping process, the panels 78-84 are caused to pivot outwardly when engaged by the corners of the turntable 76 during rotation of the turntable 76. The corners of the turntable 76 are preferably round to facilitate sliding engagement between the turntable 76 and the panels 78-84.

From the above description it is clear that the presently disclosed and claimed invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method of packaging a plurality of preformed flower pot covers, each preformed flower pot cover formed from a flexible sheet of material which is formed into a size and shape to receive a flower pot, the preformed flower pot cover having a base with a closed lower end and an open upper end with an object opening extending therethrough for receiving the flower pot and further having a decorative skirt extending angularly upwardly and outwardly from the upper end of the base, the method comprising:

providing a portable platform having at least one preformed flower pot cover receiving recess adapted to receive at least a portion of the base of a preformed flower pot cover, the portable platform having an angularly disposed upper surface extending about the at least one preformed flower pot cover receiving recess so that at least a portion of the decorative skirt of the preformed flower pot cover extends above and is supported by the angularly disposed upper surface when the base of the preformed flower pot cover is positioned within the at least one preformed flower pot cover receiving recess;

forming at least one stack of preformed flower pot covers such that the preformed flower pot covers of the at least one stack are nested within one another; and supporting the at least one stack of preformed flower pot covers within the at least one preformed flower pot cover receiving recess so that the decorative skirt of the preformed flower pot covers is positioned on and supported by the angularly disposed upper surface of the portable platform extending about the at least one preformed flower pot cover receiving recess.

2. The method of claim 1 wherein, in the step of providing a portable platform, the portable platform has a plurality of preformed flower pot cover receiving recesses adapted to receive at least a portion of the base of a preformed flower pot cover, the portable platform having an angularly disposed upper surface extending about each preformed flower pot cover receiving recess so that at least a portion of the decorative skirt of the preformed flower pot cover is positioned on and supported by the angularly disposed upper surface when the base of the preformed flower pot cover is positioned within the preformed flower pot cover receiving recess.

3. The method of claim 2, further comprising the step of securing the stacks of preformed flower pot covers in a stable condition to the portable platform.

4. The method of claim 3, wherein the securing step includes wrapping a flexible sheet of material about at least a portion of a periphery of the portable platform and the stacks of preformed flower pot covers supported on the portable platform.

5. A method of transporting a plurality of preformed flower pot covers, each preformed flower pot cover formed from a flexible sheet of material which is formed into a size and shape to receive a flower pot, the preformed flower pot cover having a base with a closed lower end and an open upper end with an object opening extending therethrough for receiving the flower pot and further having a decorative skirt extending angularly upwardly and outwardly from the upper end of the base, the method comprising:

providing a portable platform having a plurality of preformed flower pot cover receiving recesses wherein each of the plurality of preformed flower pot cover receiving recesses is adapted to receive at least a portion of the base of a preformed flower pot cover, the portable platform having an angularly disposed upper surface extending about each of the plurality of preformed flower pot cover receiving recesses so that at least a portion of the decorative skirt of the preformed flower pot cover is positioned on and supported by the angularly disposed upper surface when the base of the preformed flower pot cover is positioned within one of the plurality of preformed flower pot cover receiving recesses;

forming at least one stack of preformed flower pot covers such that the preformed flower pot covers of the at least one stack are nested within one another;

supporting the at least one stack of preformed flower pot covers within at least one of the plurality of preformed flower pot cover receiving recesses so that the decorative skirt of the preformed flower pot covers extends above and is supported by the angular upper surface of the portable platform extending about each of the plurality of preformed flower pot cover receiving recesses ; and transporting the portable platform with the at least one stack of preformed flower pot covers supported thereon to a predetermined destination.

6. The method of claim 5, further comprising the step of securing the at least one stack of preformed flower pot covers in a stable condition to the portable platform.

7. The method of claim 6, wherein the securing step includes wrapping a flexible sheet of material about at least a portion of a periphery of the portable platform and the at least one stack of preformed flower pot covers supported on the portable platform.

* * * * *